United States Patent [19]
Lu et al.

[11] Patent Number: 5,703,684
[45] Date of Patent: Dec. 30, 1997

[54] APPARATUS FOR OPTICAL DIFFERENTIAL MEASUREMENT OF GLIDE HEIGHT ABOVE A MAGNETIC DISK

[75] Inventors: Huizong Lu, Coconut Creek; Ali Reza Taheri, Boca Raton, both of Fla.

[73] Assignee: International Business Machines Corporation, Armonk, N.Y.

[21] Appl. No.: 710,818

[22] Filed: Sep. 23, 1996

[51] Int. Cl.$^6$ ............................................. G01B 9/02
[52] U.S. Cl. ............................................. 356/357; 356/351
[58] Field of Search ............................ 356/345, 351, 356/357, 359

[56] References Cited

U.S. PATENT DOCUMENTS

| | | | |
|---|---|---|---|
| 4,298,283 | 11/1981 | Makosch et al. | 356/351 |
| 4,320,973 | 3/1982 | Fortunato et al. | 356/346 |
| 4,534,649 | 8/1985 | Downs | 356/351 |
| 4,844,616 | 7/1989 | Kulkarne et al. | 356/351 |
| 5,122,648 | 6/1992 | Cohen et al. | 250/201.3 |
| 5,469,259 | 11/1995 | Golby et al. | 356/351 |
| 5,475,488 | 12/1995 | Fukuzawa et al. | 356/357 |
| 5,600,441 | 2/1997 | De Groot et al. | 356/357 |

FOREIGN PATENT DOCUMENTS 1392395  4/1975  United Kingdom.

OTHER PUBLICATIONS

T. Bayer and G. Makosch, Photolithgraphic Process Control By Optical Phase Monitoring Of Latent Images In Photoresist, IBM Tech. Disclosure Bulletin, vol. 34, No. 10A, Mar., 1992, pp. 140–143.

U. Frank–Schmidt and G. Makosch, Interferometric Method Of Checking The Overlay Accuracy In Photolithographic Exposure Processes, IBM Tech. Disclosure Bulletin, vol. 32, No. 10B, Mar. 1990, pp. 214–217.

G. Makosch, System For Stepless Beam Splitting, IBM Tech., Disclosure Bulletin, vol. 30, No. 11, Apr. 1988, pp. 249–250.

H. Korth and F. Schedwie, Analyzing Optical Phase Structures, IBM Tech. Disclosure Bulletin, vol. 24, No. 6, Nov., 1981, pp. 3094–3095.

Primary Examiner—Frank G. Font
Assistant Examiner—Robert Kim
Attorney, Agent, or Firm—Ronald V. Davidge; Richard A. Tomlin

[57] ABSTRACT

A glide height tester for inspecting a surface of a spinning magnetic disk includes a glide plate, which is mounted to pivot above the disk surface. A reflective surface fastened to the glide plate is imaged by interferometric apparatus which produces a calculated output indicating a first angle of the glide plate. The interferometric apparatus includes a Wollaston prism, which can be rotated 90-degrees to provide an output indicating a second angle of the glide plate, perpendicular to the first angle.

12 Claims, 2 Drawing Sheets

APPARATUS FOR OPTICAL DIFFERENTIAL
MEASUREMENT OF GLIDE HEIGHT
ABOVE A MAGNETIC DISK

CROSS REFERENCE TO A RELATED
APPLICATION

A co-pending U.S. application, Docket Number BC9-96-050, entitled "Optical Differential Profile Measurement and Apparatus," filed on the same day as the present application, and having a common assignee therewith, describes an interferometer configured particularly to determine a difference in height between two spaced-apart test spots on a test surface.

A co-pending U.S. application, Docket Number BC9-96-052, entitled "Optical Apparatus for Inspecting Laser Texture," filed on the same day as the present application, and having a common assignee therewith, describes the use of an interferometer configured to measure the profile of textured spots on a disk in comparison to an adjacent flat surface.

A co-pending U.S. application, Docket Number BC9-96-055, entitled "Optical Apparatus for Rapid Defect Analysis," filed on the same day as the present application, and having a common assignee therewith, describes apparatus including a first type of interferometer rapidly scanning a surface for defects and a second type of interferometer providing surface profiles of the defects.

BACKGROUND OF THE INVENTION

FIELD OF THE INVENTION

This invention relates to apparatus for measuring changes in the glide height of a simulated magnetic head above a test surface of a magnetic disk under test, and, more particularly, to optical apparatus providing a non-contact method for measuring such changes.

BACKGROUND INFORMATION

A typical computer hard file includes a number of magnetic read/write heads which glide adjacent to the surfaces of a spinning stack of magnetic disks during operation of the hard file. This gliding action is brought about as a layer of air, dragged along by the spinning disk surface, is compressed between the surface of the disk and the adjacent surface of the magnetic head. This effect causes each magnetic head to ride at a distance, conventionally, of 6 to 12 microinches (0.15 to 0.30 microns) from an adjacent magnetic disk surface. This distance is small enough to allow high density recording while preventing the damage that would otherwise be caused by contact between the spinning disk and the magnetic head.

In the process of manufacturing hard files, a measure of the satisfactory condition of a magnetic disk is provided by determining the glide conditions which can be established between the disk and a magnetic head, or a device simulating a magnetic head. In particular, the effect of outward-extending defects in the surface of the magnetic disk is studied during glide height testing, since such defects, when large enough to close the gap between the magnetic disk and the magnetic head simulator, strike the magnetic head simulator. In a conventional glide height tester, the movement of a magnetic head simulator is sensed by means of a piezo-electric transducer, which generates an electrical signal indicating the adjacent passage thereby of an outward-extending defect.

However, conventional glide height testers using piezo-electric transducers encounter problems of susceptibility to acoustical noise in the test area and of limited sensitivity, making their use increasingly difficult as new manufacturing techniques make improvements in disk flatness, so that the glide height may be reduced. Furthermore, when an upward-extending defect is encountered by a conventional glide height tester, vibrations causing translation in various directions are initiated, with the piezo-electric transducer producing an output reflecting these vibrations as well as the movement directly resulting from impact. Such an output makes it difficult to evaluate the results of the test process. In particular, it is difficult to determine whether a vibration pattern was caused by a single upward-extending defect, or by a number of such defects.

Thus, what is needed is a glide height tester having an increased sensitivity to particular movements, such as the angular deflection of a pivoted, simulated magnetic head, and with a decreased sensitivity to acoustic noise and to other types of movements, such as translational vibration.

DESCRIPTION OF THE PRIOR ART

U.S. Pat. No. 5,469,259 describes an interferometer of a common mode shearing type, which produces a pair of sheared optical beams both incident on a surface being inspected. These shared beams are produced by a compound Wollaston prism, which projects a real splitting point in the rear focal plane of a microscopic objective. The objective lens forms interferograms of portions of the surface being inspected on both an area array CCD sensor, used for static surface acquisition, and a line scan CCD sensor, used for moving surface acquisition as the test surface is moved, or scanned, past the objective lens. A dual-purpose illumination arm provides different forms of illumination required for the static (area) and moving (scanning) processes.

When the scanning process is to be performed, the interferometer is adjusted to produce a dark field interferogram on the line scan CCD sensor, with flat areas of the surface being scanned remaining dark, while anomalies, whether raised or depressed, appear as bright areas. Thus, while the scanning process is useful for determining the locations of anomalies, to a degree, their areas, many important features of an individual anomaly, such as whether it is raised or depressed and its height or depth cannot be determined.

On the other hand, when the interferometer of U.S. Pat. No. 5,469,259 is used in the static mode, analyzing a stationary interferometric image projected on the area array CCD sensor, the height or depth of the anomaly and various details of its shape can be readily determined. The disadvantage of this mode is that the surface under test must be held stationary as each anomaly is checked. Thus, a time to move between anomalies must be added to the time required for measurements and calculations, making the measurement of an individual anomaly take as long as 0.8 sec.

In order to apply an interferometer within the glide height test process, what is needed is a method for establishing movements of a reflective surface in response to changes in the glide height, together with an interferometer providing a real-time, quantitative output with such movements, indicating their magnitude.

SUMMARY OF THE INVENTION

According to one aspect of the invention, there is provided apparatus for inspecting a surface of a disk. The apparatus includes means for rotating the disk about its center, a glide plate movably mounted to extend adjacent the surface to the disk, a reflective surface mounted to move with the guide plate, and an optical mechanism for measuring rotation of the reflective surface in a first pivoting direction. Air dragged by rotation of the disk causes movement of the glide plate.

DETAILED DESCRIPTION

Figure 1:
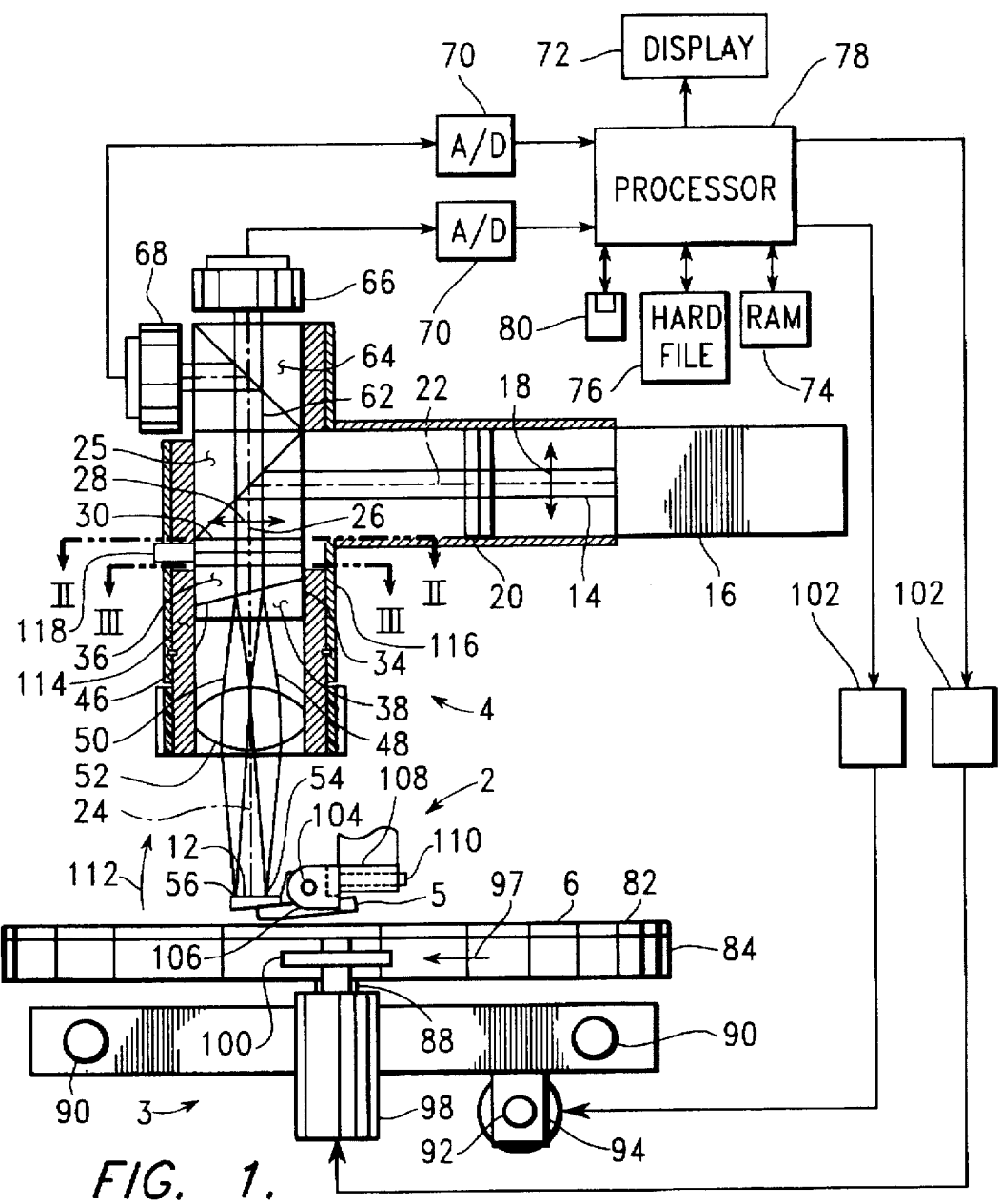
FIG. 1 is a schematic elevation of a glide height tester built in accordance with the present invention.

FIG. 1 is a schematic elevation of a glide height tester built in accordance with the present invention. This apparatus includes a magnetic-head simulator, generally indicated as 2, a disk drive assembly, generally indicated as 3, and an interferometer, generally indicated as 4. In the magnetic-head simulator 2, a glide plate 5 is mounted to pivot about two axes while being held above a spinning disk 6 undergoing the test process. The disk drive assembly 3 provides for both rotation and translation of the disk 6. The interferometer 4 images a reflective surface 12 attached to the glide plate 5.

Within this apparatus, the reflective surface 12 is illuminated from a beam 14 projected from a laser unit 16. A laser unit having an output beam with a wavelength of 532 nanometers has proven to be satisfactory in this application. This beam leaves the laser unit vertically polarized, as indicated by arrow 18. A half-wave plate 20 is rotated about the axis 22 of the laser beam 14 to provide a fine adjustment of the vertical polarization of the laser beam 14 projected therethrough. After passing through half-wave plate 20, a portion of the laser beam 22 is deflected downward, along an optical axis 24 of the interferometer 10, within a non-polarizing beamsplitter 25. A portion of the laser beam 14 is wasted, being transmitted through the beamsplitter 25 instead of reflected therein. The downward-directed reflected laser beam 26, which is horizontally polarized as indicated by arrow 28 is projected through a second half-wave plate 30.

Figure 2:
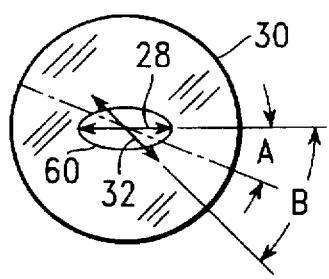
FIG. 2 is a schematic plan view of a half-wave plate in an interferometer in the glide height tester of FIG. 1, taken as indicated by section lines II—II in FIG. 1 to show the polarization orientations of coherent beams travelling therethrough.

FIG. 2 is a schematic plan view of the second half-wave plate 30, taken as indicated by section lines II—II in FIG. 1, to show the polarization orientations of laser beams projected therethrough. The transmission of linearly polarized light through a haft-wave plate results in the rotation of the angle of polarization through an angle which is twice the angle between the direction of polarization and the crystal axis of the material composing the half-wave plate. In the example of half-wave plate 30, the crystal axis is at a 22.5 degree angle, indicated as angle A, from the polarization direction, indicated by arrow 28, of the downward-reflected beam 26 (shown in FIG. 1 ). Therefore, in passing through half-wave plate 30, the direction of polarization of this laser beam is rotated through a 45-degree angle, indicated as angle B, to have the orientation indicate by arrow 32.

Figure 3:
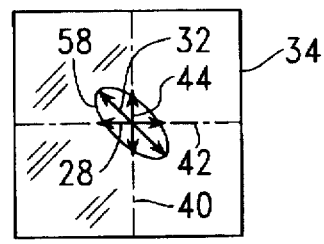
FIG. 3 is schematic plan view of a Wollaston prism in the interferometer in the glide height tester of FIG. 1, taken as indicated by section lines III—III in FIG. 1 to show the polarization orientations of laser beams travelling therethrough.

FIG. 3 is a schematic plan view of a Wollaston prism 34, directly below the second half-wave plate 30, taken as indicated by section lines III—III in FIG. 1, to show the polarization of laser beams traveling through the upper portion of the prism 34.

Referring to FIGS. 1 and 3, the Wollaston prism 34 is composed of a pair of wedge-shaped segments 36, 38 of crystalline material having crystal axes 40, 42 which are perpendicular to one another and to the optical axis 24 of the interferometer 4. Thus, the downward deflected laser beam 26 enters the Wollaston prism 34 being polarized in a direction at a 45-degree angle from the optical axis of the upper wedge-shaped segments 36, and is therefore decomposed into a pair of sub-beams of equal intensity, polarized in the mutually-perpendicular directions indicated by arrows 28, 44. Since the crystalline material forming each segment 36, 38 of the Wollaston prism 34 is birefringent, refracting beams polarized at different angles in different directions, the two sub-beams travelling downward therethrough, being polarized perpendicularly to one another, as indicated by arrows 28, 44, are refracted differently at the interface 46 between the segments 36, 38. In general, the Wollaston prism separates the two sub-beams exiting its lower surface by a deviation angle, which is a function of the wavelength of the laser beam, the indices of refraction of the materials of which the wedge-shaped portions 36, 38, and the angle at which the interface surface 46 is sloped.

In general, a Wollaston prism may be composed of a number of wedge-shaped segments, from a single segment up to three or more segments. In a Wollaston prism having one or two segments, the sub-beams diverge from a surface, such as interface surface 46, which is called a split point. In a Wollaston prism having three or more segments, the sub-beams are typically brought back together, to cross one another at a cross-over point between the Wollaston prism and the objective lens. If there is no cross-over point, the split point is in the back focal plane of the objective lens. If there is a cross-over point, the final cross-over point is in the back focal plane of the objective lens.

In this way, a right sub-beam 48 having a first direction of polarization and a left sub-beam 50, having a direction of polarization perpendicular to that of right sub-beam 48 are formed. Both of these sub-beams 48, 50 pass through an objective lens 52, being focussed on reflection points 54, 56, respectively. After reflecting off the reflection points 54, 56 the sub-beams 48, 50 return upward through objective lens 52 and Wollaston prism 34, being recombined at the upper wedged-shaped segment 36 of the prism 34. During the process of reflection off the reflection points 54, 56, the directions of polarization remain as indicated by arrows 28, 44.

In the example of FIG. 1, test surface spot 54 is raised above the level of reflection point 56. Since the distances travelled by the sub-beams 48, 50 are different, the times required for projection and reflection from the reflection points 54, 56, respectively, are different, producing a phase-shift between the two sub-beams 48, 50 as they are reflected back to the Wollaston prism 34. When these reflected sub-beams are recomposed within the Wollaston prism 34, due to this phase shift, they form an elliptically polarized beam, having major and minor axes extending at 45-degree angles to the crystal axes 40, 42 of the materials making up the Wollaston prism 34. In FIG. 3, the polarization of this recomposed beam is indicated by an ellipse 58.

Referring to FIGS. 2 and 3, as the recomposed beam is transmitted upward through half-wave plate 30, its elliptical polarization is rotated to have major and minor axes extending in the direction of arrow 28 and in the direction perpendicular thereto, as indicated by an ellipse 60. The relative intensities along the major and minor axes of ellipse 60 are determined by the phase-shift between the sub-beams 48, 50 returning after reflection from the reflection points 54, 56.

Referring again to FIG. 1, the recomposed beam is transmitted upward from half-wave plate 30 into the non-polarizing beamsplitter 25, with the transmitted portion 62 of this recombined beam being used for subsequent measurements, as the portion of this beam reflected within the beamsplitter 25 is discarded. The elliptical polarization indicated by ellipse 60 in FIG. 2 is retained. The transmitted portion 62 of this beam is next split within a polarizing beamsplitter 64, with a portion of the beam 62 polarized in the direction indicated by arrow 28 being transmitted a first photodetector 66, while a portion of the beam 62 polarized in the direction of arrow 44 (shown in FIG. 3) is reflected into a second photodetector 68.

The output of each photodetector 66, 68 is provided as an input to a corresponding analog to digital convertor 70, which in turn provides an input to a computer processor 72. This processor 72 is a conventional device connected to conventional devices, such as a system memory 74, a hardfile 76, and a display unit 78. Programs for execution within the processor 72 are loaded into memory 74 from a diskette 80.

Referring to FIGS. 1–3, the relative illumination intensities measured at photodetectors 66, 68 provide an indication of relative intensities of the polarization along the major and minor axes of the elliptical polarization indicated by ellipse 60, and hence of the phase shift between the returning sub-beams 48, 50. This phase shift is a function of the relative heights of reflection points 54, 56 and of parameters within the interferometer 4. The elliptically polarized return beam exiting half-wave plate 30 may be mathematically broken into an X-vector, $V_x$, describing light polarized in the direction indicated by arrow 28, and a Y-vector, $V_y$, describing light polarized in the direction indicated by arrow 44. The values of these vectors are given as a function of the time variable, t, by:

$$V_x = A_0 \sin(\omega t + kL + 2kd + \phi_0) \quad (1)$$

$$V_y = A_0 \sin(\omega t + kL) \quad (2)$$

Thus, the X-and Y-vectors have the same amplitude, $A_0$, differing only in phase angle. In these equations, $\omega$ is the angular frequency of the laser beam, in radians per second, L is the original length of the light path, which does not matter because it has the same effect on both equations (1) and (2), d is the height difference which is being measured by this process, $\phi_0$ is an original phase angle, which is the phase angle provided by the apparatus when the reflection points 54, 56 are at the same height, and k is a wave number, which is defined as follows:

$$k = \frac{2\pi}{\lambda} \quad (3)$$

In this expression, $\lambda$ is the wavelength of the laser beam.

To simplify the following mathematical derivation, these equations are rewritten using complex notation as:

$$V_x = A_0 e^{i(\omega t + kL + 2kd + \phi_0)} \quad (4)$$

$$V_y = A_0 e^{i(\omega t + kL)} \quad (5)$$

After passing through the beamsplitter 25, the elliptically polarized return beam 62 is broken into sub-beams within polarizing beamsplitter 64. Since the beamsplitter 25, being a non-polarizing type, handles differing polarities in the same way, losses in the transmission through this beamsplitter 25 are not considered, as it is determined that the light level at photodetector 68 is given by:

$$V_s = V_x \cos 45° + V_y \cos 45° \quad (6)$$

$$V_s = \frac{\sqrt{2}}{2} A_0 [e^{i(\omega t + kL + 2kd + \phi_0)} + e^{i(\omega t + kL)}] \quad (7)$$

Similarly, the light level at photodetector 66 is given by:

$$V_p = \frac{\sqrt{2}}{2} A_0 [e^{i(\omega t + kL + 2kd + \phi_0)} - e^{i(\omega t + kL)}] \quad (8)$$

The light intensity measured at photodetector 68 is obtained by multiplying $V_s$ times its conjugate, resulting in the following equation:

$$I_1 = \frac{A_0^2}{2} [e^{i(\omega t + kL + 2kd + \phi_0)} + e^{i(\omega t + kL)}] \quad (9)$$
$$[e^{-i(\omega t + kL + 2kd + \phi_0)} + e^{-i(\omega t + kL)}]$$

Next, $I_0$ is defined as equal to the square of $A_0$, the imaginary portion of the above equation is eliminated, and the real portion of the equation is rewritten as:

$$I_1 = \frac{I_0}{2} [2 + \cos(2kd + \phi_0)] \quad (10)$$

$$I_1 = I_0 \cos^2\left(kd + \frac{\phi_0}{2}\right) \quad (11)$$

Similarly the beam intensity at sensor 66 is given by:

$$I_2 = I_0 \sin^2\left(kd + \frac{\phi_0}{2}\right) \quad (12)$$

The preceding discussion assumes that the incoming laser beam 14, which is directed downward at the half-wave plate 30, is perfectly polarized in the direction of arrow 28 when it enters the half-wave plate 30. In other words, the preceding discussion assumes the following equations to be true:

$$I_x = I_0 \quad (13);$$

$$I_y = 0 \quad (14)$$

A more realistic mathematical model is given by the following equations, in which $\Gamma$ has a value, depending on various aspects of the apparatus, between 0 and 1. If the input beam from the laser entering half-wave plate 30 is entirely polarized in the x-direction indicated by arrow 28, $\Gamma$ is equal to one. If this beam is entirely polarized in the y-direction indicated by arrow 44 (shown in FIG. 3), $\Gamma$ is equal to zero.

$$I_x = \Gamma I_0 \quad (15)$$

$$I_y = (1-\Gamma) I_0 \quad (16)$$

Under these conditions, the illumination intensity, $I_1$, of the beam impinging on photodetector 68, and the illumination intensity, $I_2$, of the beam impinging on photodetector 66, are given by the following equations:

$$I_1 = \Gamma I_0 \cos^2\left(kd + \frac{\phi_0}{2}\right) + (1 - \Gamma)I_0 \sin^2\left(kd + \frac{\phi_0}{2}\right) \quad (17)$$

$$I_2 = \Gamma I_0 \sin^2\left(kd + \frac{\phi_0}{2}\right) + (1 - \Gamma)I_0 \cos^2\left(kd + \frac{\phi_0}{2}\right) \quad (18)$$

The mathematics associated with these intensities is simplified by considering the sum and differences of Equations (17) and (18), yielding the following results:

$$I_1 - I_2 = (2\Gamma - 1)I_0 \cos(2kd + \phi_0) \quad (19)$$

$$I_1 + I_2 = I_0 \quad (20)$$

A differential intensity parameter is formed by dividing the difference between the illumination intensity signals by their sum. Thus, this differential intensity parameter S is given by the following equation:

$$S = \frac{I_1 - I_2}{I_1 + I_2} = (2\Gamma - 1)\cos(2kd + \phi_0) \quad (21)$$

The interferometer 4 can be adjusted, particularly by moving the Wollaston prism 34 in the directions indicated by arrow 28, so that $\phi_0$ is equal to 0, $\pi/2$, or another convenient value. Such an adjustment may, for example, be made so that, when the reflective surface 12 is perpendicular to the optical axis 24, the output values of the two photodetectors 66, 68 are equal.

Next $\phi_0$ is set to $-\pi/2$, so that S is expressed as:

$$S = (2\Gamma - 1)\sin 2kd = (2\Gamma - 1)\sin\left(\frac{4\pi d}{\lambda}\right) \quad (22)$$

With this substitution, S has the same sign as d. Equation (22) is in a form which can be solved for the distance d, yielding:

$$d = \left(\frac{\lambda}{4\pi}\right)\arcsin\left(\frac{S}{2\Gamma - 1}\right) \quad (23)$$

This equation holds true as long as the following relationships are met:

$$0 \leq \Gamma \leq 1; \quad (24)$$

$$\Gamma \neq \frac{1}{2} \quad (25)$$

Thus, during measurement processes, a program is executed in processor 72 to determine the distance in height between the two reflection points 54, 56, indicated as d in the equations, by substituting the illumination intensity values, indicated in the equations as $I_1$ and $I_2$ in the equations, measured by photodetectors 66, 68, into the equations (22) and (23).

Continuing to refer to FIG. 1, these measurements and calculations are made as the disk 6 being tested is driven by disk drive assembly 3, with the upper disk surface 82 being examined. The disk 6 is mounted atop a turntable 84, which is mounted to rotate on a carriage 86 about a shaft 88. The carriage 86 is in turn mounted to slide on a pair of parallel guide shafts 90, being driven by a leadscrew 92, engaging an internally threaded block portion 94 of the carriage 86. The leadscrew 92 is driven by a motor 96. Rotary motion of the turntable 84 in the direction of arrow 97 is achieved using a second motor 98 driving a wheel 100 engaging an outer surface of the turntable 84. The motors 96, 98 are driven to scan the surface 82 past the magnetic head simulator 2 according to a pre-determined path by means of driver circuits 102 in response to a program routine executing in processor 72. Since, during scanning, the output levels of photodetectors 66, 68 may continuously change, these outputs are preferably examined by sampling on a periodic basis. This sampling process may obtain an instant level of intensity measurement or an average intensity level occurring over a short time, such as the time between samples.

In the magnetic head simulator 2, glide plate 5 is pivotally mounted at a pitch pin 104 within a pivoting bracket 106, which is in turn pivotally mounted on a support bracket 108 by means of a yaw pin 110. (While these pins 104, 110 provide a graphical indication of how motion is to occur, it is understood that actual pivoting may be applied through jewel bearings, knife edges and the like, or that flexible parts may be used to simulate pivoting.) The support bracket 108 may be held downward or upward with a spring force, or it may simply be held stationary. With an ideally flat disk surface 82, the air dragged under the glide plate 5 by the motion of the surface 82 holding the plate 5 upward, rotated in the direction of arrow 112, off the disk surface 82. Various changes in the disk surface 82 cause angular movement of the glide plate 5 about pitch pin 104. In particular, if an surface defect extends upward through the gap established between the surface 82 and the glide plate 5, to contact the glide plate, a rapid pivoting movement in the direction of arrow 112 is caused by shock loading.

Since the reflective surface 12 is attached to guide plate 5, it pivots through the same angle as the guide plate 5. Since the interferometer apparatus provides an output, given by equation (23), which is sensitive only to changes in the difference between the lengths of the sub-beams to reflection points 54 and 56, pitch angle, which is the angle changed by rotation of the glide plate 5 about pitch pin 104, is calculated by the following equation:

$$\alpha = \arctan\frac{d}{s} = \frac{d}{s} \quad (26)$$

In this equation, $\alpha$ is the pitch angle, d is the distance calculated according to equation (23) and s is the distance between the reflection points 54 and 56 The simplification of this equation (26) results from taking advantage of the fact that, for small angles, such as those likely to be encountered with this apparatus, the tangent of an angle approximates the value of the angle, in radians. For example, if the separation between reflection points 54 and 56 is 100 microns, a 0.1 milliradian variation in pitch angle results in a height variation, d, of 10 nanometers, which is well within the sensitivity of the apparatus. (The separation between reflection points 54, 56 and the size of the elements within magnetic head simulator 2 have been greatly exaggerated in FIG. 1 for clarity.)

Furthermore, since identical changes occurring simultaneously in both of the sub-beams 48, 50 do not result in an output signal from the interferometer, this apparatus is not sensitive to linear vibrations, which may result from ambient acoustical noise. This insensitivity to sources of noise provides the apparatus of the present invention with a significant advantage over devices of the background art.

The Wollaston prism 38 within interferometer 4 is preferably mounted in a way facilitating rotation about the optical axis 24 through a 90-degree angle. For example, the Wollaston prism 38 is mounted in a housing 114 which is pivotally mounted within a tube 116 extending downward as part of the interferometer 4. The objective lens 52 is mounted to turn with the Wollaston prism for convenience. If the Wollaston prism is rotated 90-degrees about optical axis 24, the resulting similar rotation of sub-beams 48, 50 brings the reflection points 54, 56 into an orientation needed to measure a yaw angle arising from a pivoting motion of the glide plate 5 about yaw pivot pin 110. This type of measurement yields additional information concerning how an actual magnetic head should be expected to operate with a specific disk 6. The tube 116 also includes a slot through which a tab 118 extends to facilitate the rotational adjustment of the half-wave plate 30.

Figure 4:
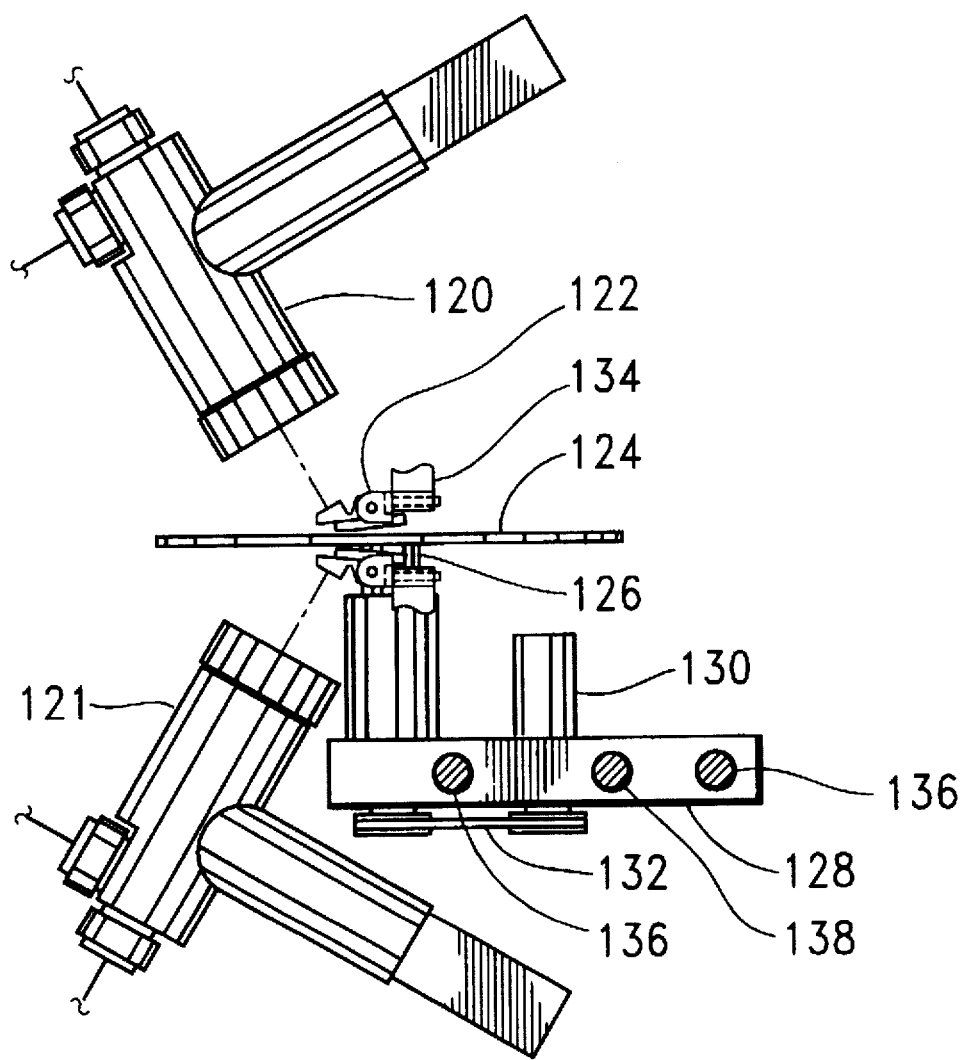
FIG. 4 is a schematic plan view of a glide height tester built in accordance with an alternate embodiment of the present invention.

FIG. 4 is an elevational view of an alternative embodiment of the present invention. In this embodiment, a pair of interferometers 120, 121 are aimed at magnetic head simulator 122 on each side of the disk 124 being examined. The disk 124 is mounted atop a spindle 126, which engages the disk by its central hole (not shown). The spindle 126, which is rotatably mounted in a carriage 128, is caused to rotate by a spindle motor 130 through a belt drive 132. The mounting brackets 134, holding the pivotally mounted magnetic head simulators 122, and the interferometers 120 are held stationary while the disk 124 is spun, and while the carriage 128 is moved along rails 136 by means of a leadscrew 138. This embodiment allows both sides of the disk 124 to be examined simultaneously, without requiring the disk to be removed from a spindle and turned over.

Since it is necessary to move the magnetic head simulators 122 quite close to the spindle 126, each interferometer 120, 121 is aimed at an oblique angle relative to the flat surfaces of the disk 124. This configuration provides clearance between the lower interferometer 121 and various parts of the spindle 126 and carriage 128. In each magnetic head simulator 122, the reflective surface 140 is configured to be perpendicular to the optical axis 142 of the corresponding interferometer 120 directing sub-beams at the particular reflective surface 140. Other aspects of the embodiment shown in FIG. 4 are as described for the embodiment of FIG. 1.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. Inspection apparatus for inspecting a surface of a disk, wherein said apparatus comprises:

means for rotating said disk about a center thereof;

a glide plate movably mounted to extend adjacent said surface of said disk, wherein air dragged by rotation of said disk causes movement of said glide plate;

a reflective surface mounted to move with said guide plate; and optical means for measuring rotation of said reflective surface in a first pivoting direction wherein said optical means comprises:

a laser producing a coherent, linearly polarized beam;

optical apparatus, wherein said coherent, linearly polarized beam is decomposed into first and second projected sub-beams, with said first projected sub-beam being linearly polarized in a first direction, with said second projected sub-beam being linearly polarized in a second direction, perpendicular to said first direction, wherein said first projected sub-beam is projected to a first test spot on said surface under test, wherein said second projected sub-beam is projected to a second test spot on said surface under test, with said first and second test spots extending along said surface under test in a spaced-apart relationship, wherein said first and second projected sub-beams, after reflection from said first and second test spots, are recombined into single, elliptically polarized return beam;

a polarizing beamsplitter in which said elliptically polarized return beam is split into a first return polarized sub-beam polarized in a third direction and a second return sub-beam, polarized in a fourth direction, perpendicular to said third direction;

a first photodetector measuring intensity of said first return sub-beam;

and a second photodetector measuring intensity of said second return sub-beam;

wherein a portion of said optical means is rotatable about an optical axis extending perpendicular to said reflective surface to measure rotation of said reflective surface in a second direction, perpendicular to said first pivoting direction.

2. The inspection apparatus of claim 1, wherein said optical apparatus includes:

a Wollaston prism, wherein said coherent, linearly polarized beam is decomposed into said first and second projected sub-beams and wherein said first and second projected sub-beams, after reflection from said first and second test spots, are recombined into said single, elliptically polarized return beam; and an objective lens, disposed between said Wollaston prism and said test surface, wherein said objective lens focusses said first projected sub-beam on said first test spot and said second projected sub-beam on said second test spot.

3. The inspection apparatus of claim 2:

wherein said Wollaston prism includes a first segment having a crystal axis extending in said third direction and a second segment having a crystal axis extending in said fourth direction;

wherein said coherent, linearly polarized beam is directed into said optical apparatus being polarized in said third direction; and wherein said optical apparatus additionally includes a half-wave plate through which said coherent, linearly polarized beam is directed into said Wollaston prism, with said half-wave plate rotating polarization of said coherent, linearly polarized beam into a direction midway between said third and fourth directions.

4. The inspection apparatus of claim 3, wherein said Wollaston prism is rotatable through a 90-degree angle about an optical axis perpendicular to said third and fourth directions to rotate said first and second test spots also through said 90-degree angle, so that rotation of said reflective test surface in a second pivoting direction, perpendicular to said first pivoting direction, is measured by said optical means.

5. The inspection apparatus of claim 4, wherein said glide plate is mounted to pivot in said first and second pivoting directions.

6. The apparatus of claim 1, wherein said glide plate is mounted to pivot in said first pivoting direction.

7. Inspection apparatus for simultaneously inspecting both flat surfaces of a disk, wherein said apparatus comprises:

a spindle rotating said disk about a center thereof;

a glide plate movably mounted to extend adjacent each said surface of said disk, wherein air dragged by rotation of said disk causes movement of said glide plate;

a reflective surface mounted to move with each said guide plate; and optical means for measuring rotation of each said reflective surface in a first pivoting direction, wherein said optical means comprises:

a laser producing a coherent, linearly polarized beam;

optical apparatus, wherein said coherent, linearly polarized beam is decomposed into first and second projected sub-beams, with said first projected sub-beam being linearly polarized in a first direction, with said second projected sub-beam being linearly polarized in a second direction, perpendicular to said first direction, wherein, said first projected sub-beam is projected to a first test spot on said surface under test, wherein said second projected sub-beam is projected to a second test spot on said surface under test, with said first and second test spots extending along said surface under test in a spaced-apart relationship, wherein said first and second projected sub-beams, after reflection from said first and second test spots, are recombined into single, elliptically polarized return beam;

a polarizing beamsplitter in which said elliptically polarized return beam is split into a first return sub-beam polarized in a third direction and a second return sub-beam, polarized in a fourth direction, perpendicular to said third direction;

a first photodetector measuring intensity of said first return sub-beam;

and a second photodetector measuring intensity of said second return sub-beam;

wherein a portion of said optical means is rotatable about an optical axis extending perpendicular to said reflective surface to measure rotation of said reflective surface in a second direction, perpendicular to said first pivoting direction.

8. The inspection apparatus of claim 7, wherein each said optical apparatus includes:

a Wollaston prism, wherein said coherent, linearly polarized beam is decomposed into said first and second projected sub-beams and wherein said first and second projected sub-beams, after reflection from said first and second test spots, are recombined into said single, elliptically polarized return beam; and an objective lens, disposed between said Wollaston prism and said test surface, wherein said objective lens focusses said first projected sub-beam on said first test spot and said second projected sub-beam on said second test spot.

9. The inspection apparatus of claim 8:

wherein each said Wollaston prism includes a first segment having a crystal axis extending in said third direction and a second segment having a crystal axis extending in said fourth direction;

wherein, within each said optical apparatus, said coherent, linearly polarized beam is directed into said optical apparatus being polarized in said third direction; and wherein said each optical apparatus additionally includes a half-wave plate through which said coherent, linearly polarized beam is directed into said Wollaston prism, with said half-wave plate rotating polarization of said coherent, linearly polarized beam into a direction midway between said third and fourth directions.

10. The inspection apparatus of claim 9, wherein each said Wollaston prism is rotatable through a 90-degree angle about an optical axis perpendicular to said third and fourth directions to rotate said first and second test spots also through said 90-degree angle, so that rotation of each said reflective test surface in a second pivoting direction, perpendicular to said first pivoting direction, is measured by each said optical means.

11. The inspection apparatus of claim 10, wherein each said glide plate is mounted to pivot in said first and second pivoting directions.

12. The apparatus of claim 7, wherein each said glide plate is mounted to pivot in said first pivoting direction.

* * * * *